United States Patent
Yamanashi

(10) Patent No.: US 10,734,750 B2
(45) Date of Patent: Aug. 4, 2020

(54) CLOSING-BODY HOLDING STRUCTURE AND ELECTRIC WIRE WITH CONNECTOR

(71) Applicant: Yazaki Corporation, Tokyo (JP)

(72) Inventor: Daisuke Yamanashi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/414,073

(22) Filed: May 16, 2019

(65) Prior Publication Data

US 2019/0363479 A1  Nov. 28, 2019

(30) Foreign Application Priority Data

May 22, 2018 (JP) .................................. 2018-097950

(51) Int. Cl.
*H01R 13/516* (2006.01)
*H01R 13/58* (2006.01)

(52) U.S. Cl.
CPC ....... *H01R 13/516* (2013.01); *H01R 13/5825* (2013.01)

(58) Field of Classification Search
CPC ............ H01R 13/5804; H01R 13/5812; H01R 13/5816; H01R 13/582; H01R 13/5825; H01R 13/58; H01R 13/5845; H01R 13/585

See application file for complete search history.

(56) References Cited

U.S. PATENT DOCUMENTS

| | | | | |
|---|---|---|---|---|
| 4,108,527 A | * | 8/1978 | Douty .................. | H01R 13/627 439/465 |
| 5,267,877 A | * | 12/1993 | Scannelli ............. | H01R 9/0521 439/584 |
| 5,908,327 A | * | 6/1999 | Tsuji .................... | H01R 13/506 439/470 |
| 5,967,830 A | * | 10/1999 | Tsuji .................... | H01R 13/506 439/467 |
| 5,997,349 A | * | 12/1999 | Yoshioka ............... | H01R 9/038 439/579 |
| 6,019,615 A | * | 2/2000 | Masuda ............... | H01R 9/0518 174/653 |
| 6,053,749 A | * | 4/2000 | Masuda ............. | H01R 13/5202 439/98 |

(Continued)

FOREIGN PATENT DOCUMENTS

| | | |
|---|---|---|
| DE | 10 2006 049 703 A1 | 4/2008 |
| JP | 11-26093 A | 1/1999 |
| JP | 2017-108587 A | 6/2017 |

*Primary Examiner* — Ross N Gushi
(74) *Attorney, Agent, or Firm* — Sughrue Mion, PLLC

(57) ABSTRACT

An electric wire with a connector includes: an opening portion that is provided to a connector housing, and that allows an electric wire to be pulled out of the connector housing; a closing body that has an electric wire insertion hole for inserting and passing the electric wire pulled out of a wire outlet of the opening portion, and that closes the wire outlet by being attached to the opening portion; and a protecting member that is tubular and into and through which the electric wire pulled out of the wire outlet via the electric wire insertion hole is inserted and passed. The closing body includes: a housing chamber that houses one end of the protecting member; and an inserted portion that includes the housing chamber and that is inserted into the opening portion.

7 Claims, 9 Drawing Sheets

(56) References Cited

U.S. PATENT DOCUMENTS

| | | | | |
|---|---|---|---|---|
| 6,152,639 A * | 11/2000 | Hsu | B25F 5/00 | 403/116 |
| 6,471,545 B1 * | 10/2002 | Hosler, Sr. | H01R 24/542 | 439/585 |
| 6,583,352 B2 * | 6/2003 | Fukushima | H01R 9/032 | 174/373 |
| 6,668,865 B2 * | 12/2003 | Miyamoto | B60R 16/0215 | 138/108 |
| 6,679,730 B2 * | 1/2004 | Dye | H01R 13/5221 | 439/275 |
| 6,971,905 B2 * | 12/2005 | Makita | H01R 13/5205 | 439/447 |
| 7,249,969 B2 * | 7/2007 | Paynter | H01R 9/0524 | 439/578 |
| 7,285,011 B2 * | 10/2007 | Hardy | H01R 13/506 | 439/582 |
| 7,311,554 B1 * | 12/2007 | Jackson | H01R 9/0521 | 439/584 |
| 7,422,470 B2 * | 9/2008 | Tsuji | H01R 13/56 | 439/470 |
| 7,540,772 B2 * | 6/2009 | Sardi | H01R 13/6592 | 439/581 |
| 7,874,865 B2 * | 1/2011 | Tobey | H01R 13/5837 | 439/460 |
| 8,007,319 B2 * | 8/2011 | Dang | H01R 4/18 | 439/607.56 |
| 8,011,935 B2 * | 9/2011 | Ko | H01R 13/5845 | 439/490 |
| 8,323,056 B2 * | 12/2012 | Clausen | H01R 24/564 | 439/584 |
| 8,449,325 B2 * | 5/2013 | Wild | H01R 24/564 | 439/578 |
| 8,460,015 B2 * | 6/2013 | Deno | H01R 9/0518 | 174/78 |
| 8,764,485 B2 * | 7/2014 | Hohner | H01R 9/0527 | 439/607.42 |
| 9,219,331 B1 * | 12/2015 | Liao | H01R 13/506 | |
| 9,225,082 B2 * | 12/2015 | Frank | H01R 9/05 | |
| 9,270,059 B2 * | 2/2016 | Dunwoody | H01R 13/6593 | |
| 9,325,134 B2 * | 4/2016 | Lopez | H01R 35/00 | |
| 10,177,469 B2 * | 1/2019 | Wu | H01R 9/0524 | |
| 10,396,511 B2 * | 8/2019 | Liu | H01R 24/564 | |
| 2014/0295703 A1 * | 10/2014 | Nagashima | H01R 13/73 | 439/607.01 |
| 2015/0144396 A1 | 5/2015 | Tanaka | | |
| 2017/0179697 A1 * | 6/2017 | Terashima | H02G 3/0462 | |
| 2018/0233837 A1 * | 8/2018 | Paynter | H01R 9/0521 | |
| 2019/0044277 A1 * | 2/2019 | Mellott | H01R 13/665 | |
| 2019/0190211 A1 * | 6/2019 | Yamanashi | H01R 13/502 | |
| 2019/0363479 A1 * | 11/2019 | Yamanashi | H01R 13/5825 | |

* cited by examiner

CLOSING-BODY HOLDING STRUCTURE AND ELECTRIC WIRE WITH CONNECTOR

CROSS-REFERENCE TO RELATED APPLICATION(S)

The present application claims priority to and incorporates by reference the entire contents of Japanese Patent Application No. 2018-097950 filed in Japan on May 22, 2018.

BACKGROUND OF THE INVENTION

1. Field of the Invention

The present invention relates to a closing-body holding structure and an electric wire with a connector.

2. Description of the Related Art

Conventionally, a connector, together with an electric wire electrically connected to a terminal metal fitting, provides an electric wire with a connector. In such an electric wire with a connector, the electric wire inside of a connector housing is pulled outside of the connector housing, via an electric wire insertion hole provided to a closing body, and the electric wire pulled out of the connector housing is protected by covering the electric wire with a protecting member, such as a corrugated tube. This closing body is provided to close a wire outlet that is provided to an opening portion of the connector housing, and holds the protecting member in such a manner that the pulled-out electric wire is not exposed. This type of an electric wire with a connector is disclosed in Japanese Patent Application Laid-open No. 2017-108587, for example. The electric wire with a connector disclosed in Japanese Patent Application Laid-open No. 2017-108587 includes a wire cover serving as the closing body. The wire cover is an assembly of two half members together covering the opening portion of the connector housing from outside, and semi-circular annular locking portions that are provided to the respective half members mesh with grooves on the corrugated tube, so that the corrugated tube is held thereby.

In the conventional electric wire with a connector, when an external force is applied to the protecting member or the wire covered with the protecting member, the force is exerted upon the closing body via the protecting member. Therefore, in the conventional electric wire with a connector, the configuration of the closing body coupled to the opening portion of the connector housing may not be maintained as intended, depending on the magnitude of the external force, or the direction in which the external force is applied.

SUMMARY OF THE INVENTION

Addressing this issue, an object of the present invention is to provide a closing-body holding structure and an electric wire with a connector capable of maintaining the configuration of the closing body coupled to the opening portion of the connector housing as intended.

In order to achieve the above mentioned object, a closing-body holding structure according to one aspect of the present invention includes an opening portion that is provided to a connector housing, and that allows an electric wire to be pulled out from an inside of the connector housing to an outside of the connector housing; a closing body that has an electric wire insertion hole for inserting and passing the electric wire pulled out of a wire outlet of the opening portion, and that closes the wire outlet by being attached to the opening portion; and a protecting member that is tubular, and into and through which the electric wire pulled out of the wire outlet via the electric wire insertion hole is inserted and passed, wherein the closing body includes a housing chamber that houses one end of the protecting member, and an inserted portion that includes the housing chamber and that is inserted into the opening portion.

According to another aspect of the present invention, in the closing-body holding structure, it is possible to configure that a holding mechanism configured to hold the closing body with respect to the opening portion is provided between the opening portion and the closing body.

According to still another aspect of the present invention, in the closing-body holding structure, it is possible to configure that the closing body includes, around the electric wire insertion hole, an annular portion that locks an end surface of the one end of the protecting member housed inside of the housing chamber in tubular axial direction.

According to still another aspect of the present invention, in the closing-body holding structure, it is possible to configure that the closing body has a structure divided into two members that are a first closing member and a second closing member, the inserted portion is formed by a first inserted portion of the first closing member and a second inserted portion of the second closing member, the electric wire insertion hole is formed by a first groove of the first closing member and a second groove of the second closing member, and the housing chamber is formed by a first cavity in the first closing member and a second cavity in the second closing member.

In order to achieve the above mentioned object, an electric wire with a connector according to still another aspect of the present invention includes a connector that includes a conductive member; an electric wire that is electrically connected to the conductive member; and a protecting member that protects the electric wire, wherein the connector includes: a connector housing that houses the conductive member, and that has an opening portion that allows the electric wire pulled out from an inside of the connector housing to an outside of the connector housing; and a closing body that has an electric wire insertion hole for inserting and passing the electric wire pulled out of a wire outlet of the opening portion, and that closes the wire outlet by being attached to the opening portion, the protecting member is a tubular member into and through which the electric wire pulled out of the wire outlet via the electric wire insertion hole is inserted and passed, and the closing body includes a housing chamber that houses one end of the protecting member, and an inserted portion that includes the housing chamber and that is inserted into the opening portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
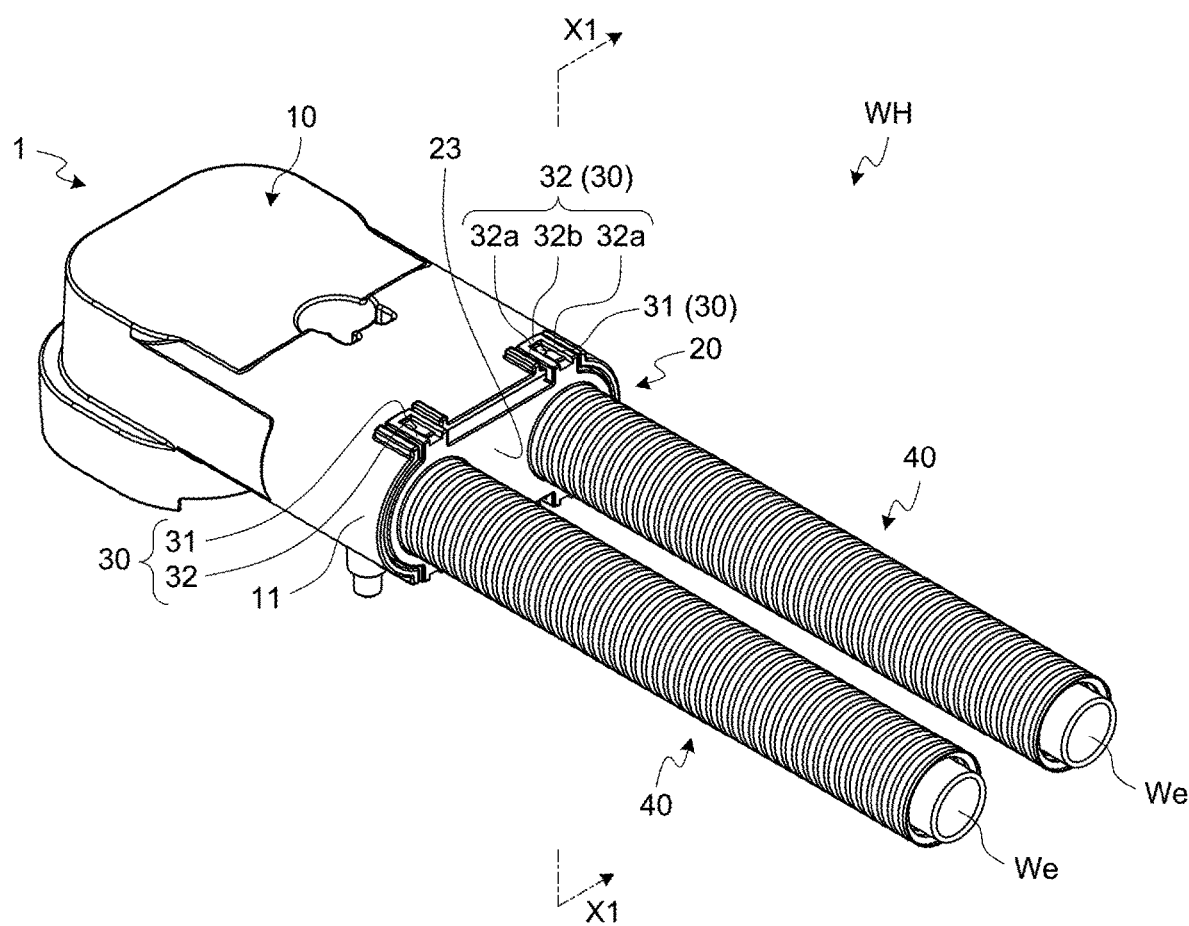
FIG. 1 is a perspective view illustrating an electric wire with a connector according to an embodiment.

A closing-body holding structure and an electric wire with a connector according to an embodiment of the present invention will be explained in detail with reference to some drawings. The embodiment is, however, not intended to limit the scope of the present invention.

Embodiment

A closing-body holding structure and an electric wire with a connector according to one embodiment of the present invention will now be explained with reference to FIGS. 1 to 5.

The reference sign 1 included in FIGS. 1 to 5 denotes a connector according to the embodiment. The reference sign WH in FIGS. 1 to 5 denotes an electric wire with a connector, in which the connector 1 is attached to an electric wire We in a manner electrically connected to each other. The closing-body holding structure is included in the electric wire with a connector WH, and includes an opening portion 11 of a connector housing 10, which will be described later, a closing body 20, a holding mechanism 30, and a protecting member 40. The electric wire with a connector WH is assembled using a connector assembling method described later.

The connector 1 together with a counterpart connector (not illustrated) provide a connector device. The connector device is a device that electrically connects objects to be connected, one of which is connected to a first connector and the other of which is connected to a second connector, via a physical and electrical connection between the first connector and the second connector. For the convenience, the connector 1 is explained to be the first connector, and the counterpart connector is explained to be the second connector.

Examples of the connected object include a power supply circuit such as an inverter, and an electric device such as a rotary machine. The connector 1 is, for example, electrically connected to such an electric device (not illustrated) via the electric wire We. The counterpart connector is connected to the housing of a power supply circuit (not illustrated), and is electrically connected to the power supply circuit via an electric wire (not illustrated). These connector 1 and counterpart connector are capable of electrically connecting the electric device and the power supply circuit by being electrically connected to each other, so that the power supply (such as a secondary battery) can supply power to the electric device, or the power supply can be charged with the power generated by the electric device.

The connector 1 according to the embodiment is electrically connected to the counterpart connector, by being inserted and fitted into the counterpart connector. When the connector 1 is disconnected from the counterpart connector, the electrical connection with the counterpart connector is lost.

The connector 1 according to the embodiment is provided with a terminal metal fitting (not illustrated) that is a conductive member. A conductive material such as a metal (e.g., copper, copper alloy, aluminum, or aluminum alloy) is formed into the terminal metal fitting having a predetermined shape, and the terminal metal fitting is electrically connected to the terminal of the electric wire We. This terminal metal fitting may have a shape of a female terminal or a male terminal. The terminal metal fitting may be electrically connected to the terminal of the electric wire We by pressure-bonding, for example, crimping, or by joining, for example, welding. The connector 1 according to the embodiment is provided with two pairs of the terminal metal fitting and the electric wire We.

The connector 1 according to the embodiment also includes a connector housing 10 that is a housing (FIGS. 1 to 5). The connector housing 10 is made of an insulating material such as a synthetic resin. The terminal metal fittings that are the conductive members are housed inside of the connector housing 10. In the example explained herein, the two terminal metal fittings are housed inside of the connector housing 10.

Figure 2:
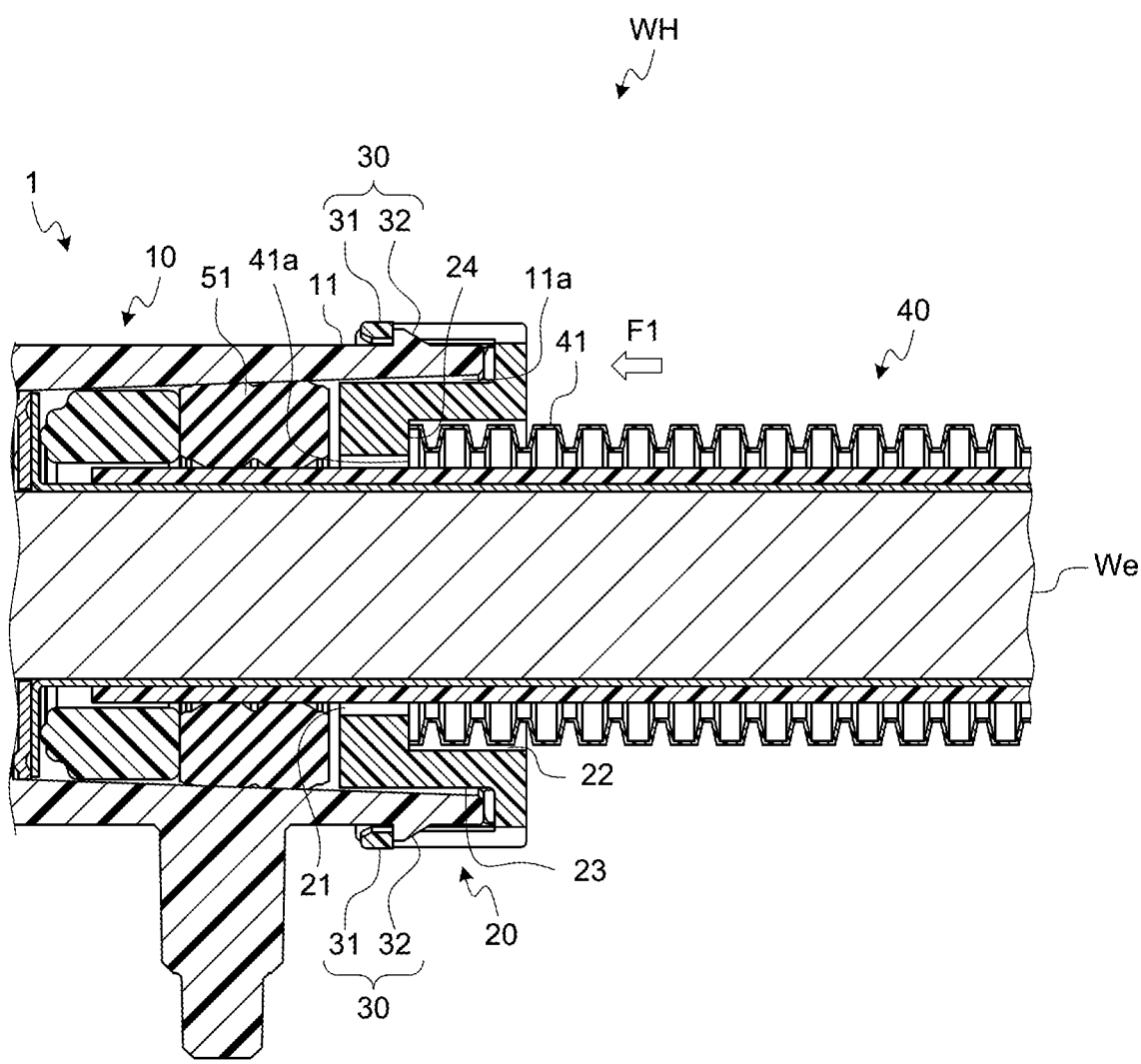
FIG. 2 is a sectional view across a line X1-X1 in FIG. 1.
Figure 3:
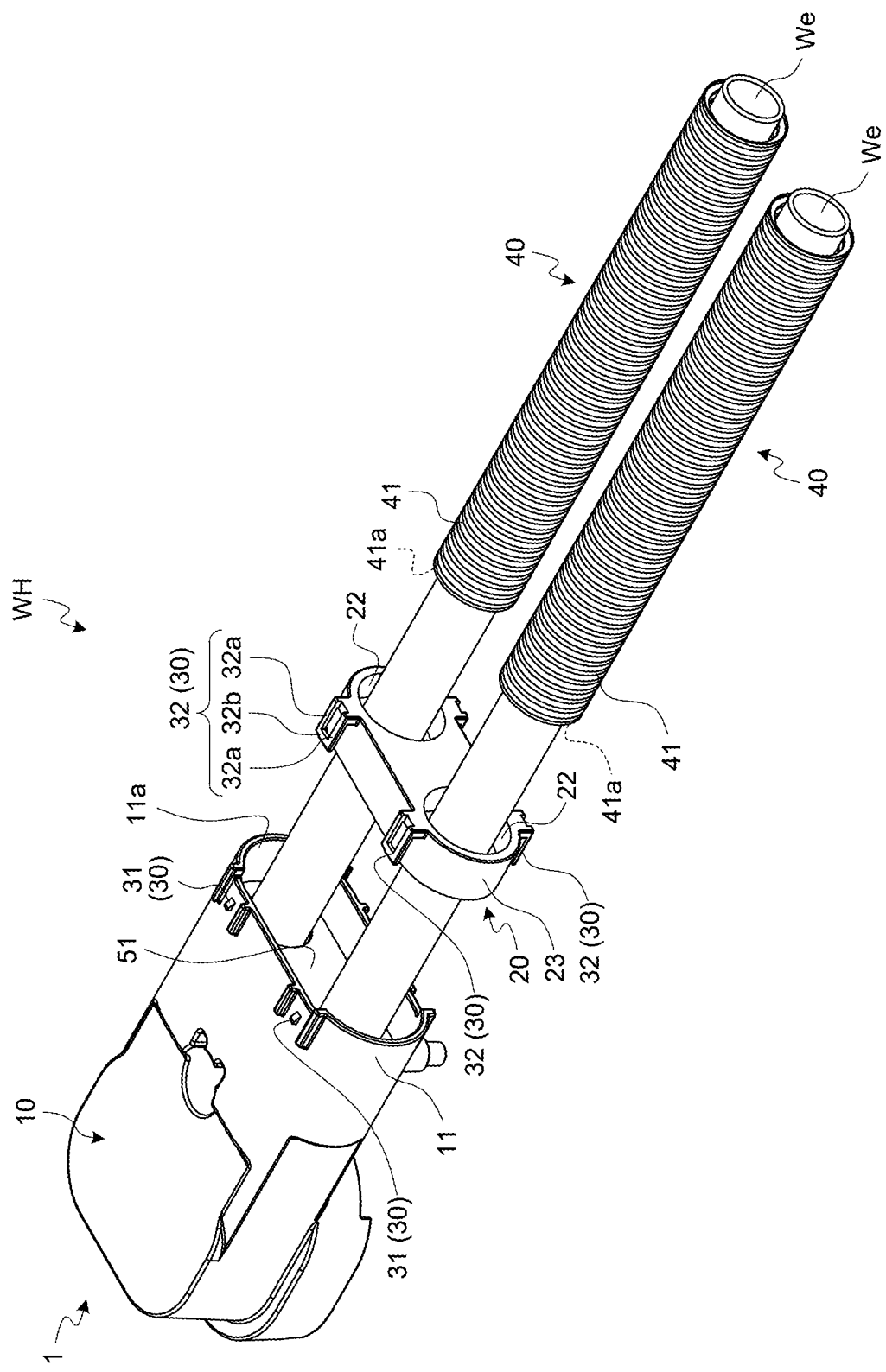
FIG. 3 is a partial exploded perspective view of the electric wire with a connector according to the embodiment.
Figure 4:
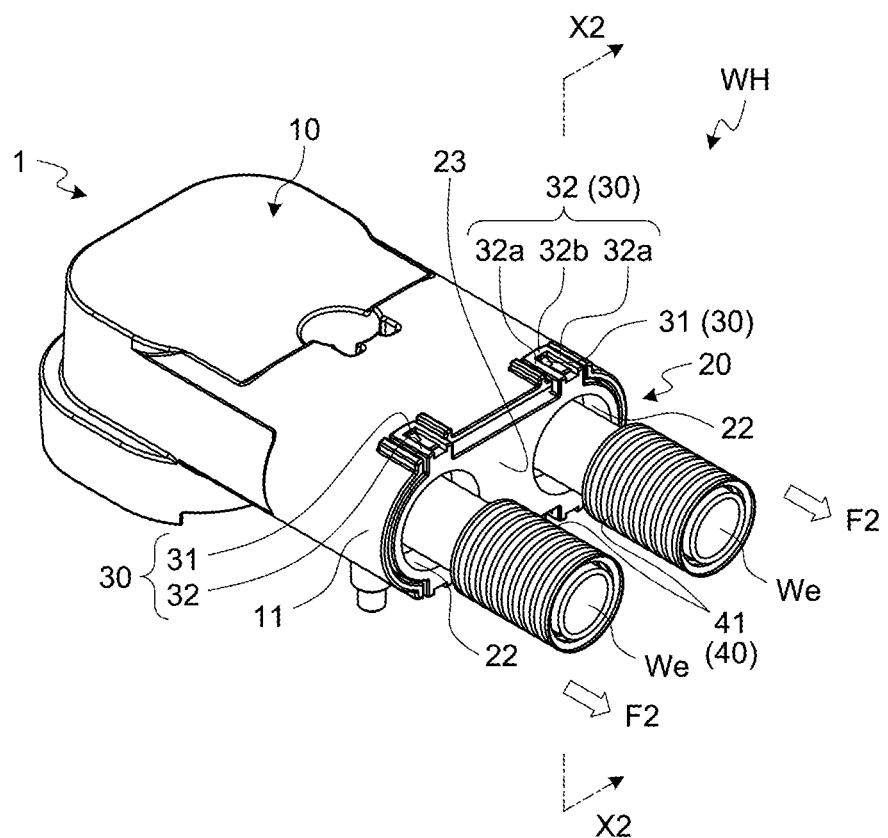
FIG. 4 is a perspective view illustrating a protecting member before releasing a compressing force.
Figure 5:
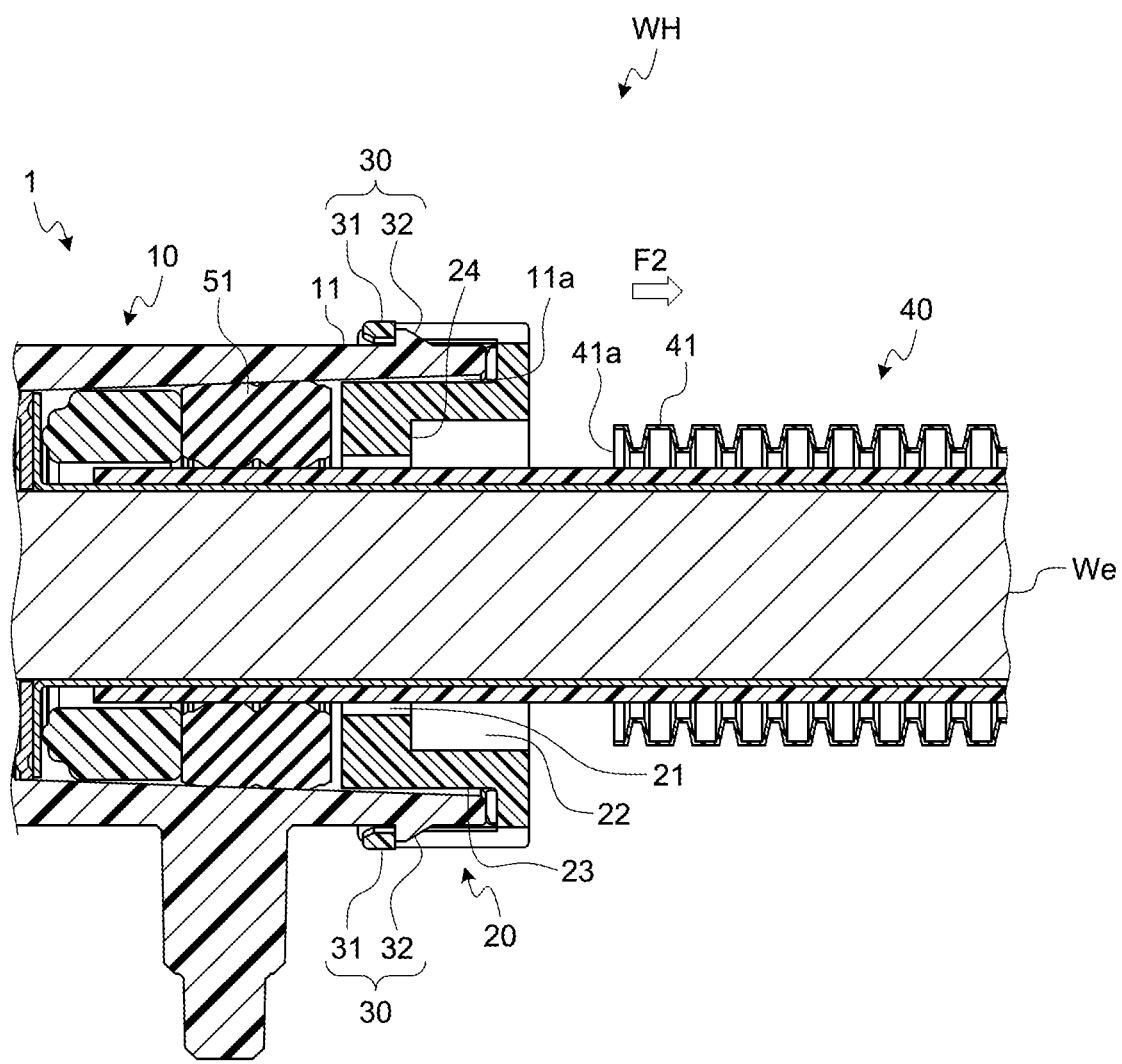
FIG. 5 is a sectional view across a line X2-X2 in FIG. 4.

The connector housing 10 has a tubular opening portion 11 through which the electric wires We electrically connected to the conductive members are pulled out from an inside of the connector housing 10 to an outside of the connector housing 10 (FIGS. 1 to 5). The opening portion 11 has openings (hereinafter referred to as "wire outlets") 11a through which the electric wires We are pulled out of the connector housing 10 (FIGS. 2, 3, and 5). The opening portion 11 may be provided for each of the electric wires We, or may be provided as one space through which a plurality of electric wires We can be pulled out. The opening portion 11 in the example explained herein has a track-like tubular shape, so that the two electric wires We can be pulled out in the same direction.

The connector 1 according to the embodiment is also provided with the closing body 20 for closing the wire outlet 11a on the opening portion 11, by being attached to the opening portion 11 (FIGS. 1 to 5). The closing body 20 is made of an insulating material such as a synthetic resin. This closing body 20 is provided with a through-hole (hereinafter referred to as an "electric wire insertion hole") 21 through which the electric wires We pulled out of the wire outlet 11a are passed (FIGS. 2 and 5). Therefore, the electric wires We are pulled out of the wire outlet 11a via the electric wire insertion holes 21. In the example explained herein, the electric wire insertion hole 21 that is circular is provided to the closing body 20, for each of the electric wires We.

The closing body 20 has a housing chamber 22 (FIGS. 2 to 5) that houses one end 41 of the protecting member 40, which will be described later, and an inserted portion 23 that has the housing chamber 22, and is inserted into the opening portion 11 (FIGS. 1 to 5).

When the inserted portion 23 is inserted into the opening portion 11 from the wire outlet 11a, the inserted portion 23 closes the wire outlet 11a. Therefore, the inserted portion 23 in the example explained herein has a track-like outer circumference with a shape matching the shape of the tubular inner circumferential surface of the opening portion 11. The housing chamber 22 is provided inside of the inserted portion 23, as a space with an opening (a hole for inserting the one end 41 of the protecting member 40). In the example explained herein, a cylindrical space is formed inside of the inserted portion 23, coaxially with the electric wire insertion hole 21, and this cylindrical space is used as the housing chamber 22. Because the electric wire We has already been pulled out of the electric wire insertion hole 21 before the one end 41 of the protecting member 40 is inserted into the housing chamber 22, a ring-like tubular space is formed between the inner circumferential surface of the cylindrical space that is the housing chamber 22, and the outer circumference of the electric wire We. The housing chamber 22 is inserted, along with the inserted portion 23, into the opening portion 11. In the inserted portion 23 in the example explained herein, the housing chamber 22 is provided for each of the electric wires We and the protecting members 40.

Provided around the electric wire insertion hole 21 on the closing body 20 is an annular portion 24 for locking an end surface 41a of the one end 41 of the protecting member 40 housed inside of the housing chamber 22, the one end 41 being one end in the tubular axial direction (FIGS. 2 and 5). The annular portion 24 in the example explained herein has a circular annular shape, and forms a part of the wall surface of the housing chamber 22.

In the closing-body holding structure and the electric wire with a connector WH according to the embodiment, the closing body 20 has the inserted portion 23, and the inserted portion 23 is inserted into the opening portion 11. Therefore, even if a force in the radial direction is exerted upon the inner circumferential surface of the housing chamber 22 from the outer circumferential side of the one end 41, due to an external force applied to the protecting member 40 or the electric wire We covered by the protecting member 40, the inserted portion 23 remains locked by the inner circumferential surface of the opening portion 11. In other words, in the closing-body holding structure and the electric wire with a connector WH, even if a force from the one end 41 of the protecting member 40 is exerted upon the closing body 20, it is possible to suppress a relative displacement of the closing body 20 with respect to the opening portion 11. Therefore, with the closing-body holding structure and the electric wire with a connector WH, the configuration of the closing body 20 coupled to the opening portion 11 of the connector housing 10 can be maintained as intended. For example, in the closing-body holding structure and the electric wire with a connector WH in the example explained herein, by suppressing the relative displacement of the closing body 20 with respect to the opening portion 11, the engagement between a first engaging body 31 and a second engaging body 32, both of which are included in the holding mechanism 30 described later, can be maintained. As a result, the configuration of the closing body 20 coupled to the opening portion 11 can be maintained as intended.

In the closing-body holding structure and the electric wire with a connector WH, the inserted portion 23 is locked by the inner circumferential surface of the opening portion 11 so that the closing body 20 does not come off from the opening portion 11. Therefore, it is preferable for the inserted portion 23 to be fitted inside of the opening portion 11, for example. In other words, in the closing-body holding structure and the electric wire with a connector WH, it is preferable to reduce the gap between the inner circumferential surface of the opening portion 11 and the outer circumference of the inserted portion 23 as much as possible within a range not obstructing the insertion of the inserted portion 23 in the opening portion 11, so that the relative displacement of the closing body 20 with respect to the opening portion 11 is reduced.

The connector 1 holds the closing body 20 with respect to the opening portion 11. The holding mechanism 30 responsible for holding is provided between the opening portion 11 and the closing body 20 (FIGS. 1 to 5). The holding mechanism 30 includes a first engaging body 31 provided to the opening portion 11, and a second engaging body 32 provided to the closing body 20 (FIGS. 1 to 5). This holding mechanism 30 holds the closing body 20 attached inside the opening portion 11 with respect to the opening portion 11, by the engagement of the first engaging body 31 and the second engaging body 32. In the example explained herein, the claw-like first engaging body 31 protrudes from the outer circumference of the opening portion 11 (FIGS. 1 to 5). The second engaging body 32 in the example explained herein has two axial portions 32a protruding in the direction that is opposite to the direction in which the electric wires We are pulled out, and facing each other with a gap therebetween in the circumferential direction of the opening portion 11, and also has a locking portion 32b connecting the ends of the respective axial portions 32a in the protruding direction (FIG. 1, FIGS. 3 and 4). In the second engaging body 32, because the axial portions 32a are flexible, as a movement for coupling the closing body 20 into the opening portion 11 takes place, the locking portion 32b is carried over the claw-like first engaging body 31, and the locking portion 32b is moved to a position facing the first engaging body 31 in the tubular axial direction of the opening portion 11. As a result, the closing body 20 is held on the opening portion 11. In the example explained herein, the holding mechanism 30 is provided at four locations.

The electric wire with a connector WH is configured as the electric wires We that are electrically connected to the connector 1, and includes the protecting members 40 for protecting the electric wires We pulled out of the wire outlet 11a through the electric wire insertion holes 21 (FIGS. 1 to 5). The protecting member 40 is made of an insulating material such as a synthetic resin. To protect the pulled out electric wire We using the protecting member 40, the electric wire We is passed through the protecting member 40. The protecting member 40 therefore has a tubular shape.

As explained earlier, the one end 41 of the protecting member 40 is housed inside of the housing chamber 22 provided to the closing body 20. Therefore, in the closing-body holding structure and the electric wire with a connector WH according to the embodiment, the chances of the electric wire We becoming exposed from the one end 41 between the closing body 20 and the protecting member 40 can be suppressed. Therefore, the function for protecting the electric wire We between the two can be ensured.

It is preferable for the protecting member 40 to be a member capable of extending and contracting in the tubular axial direction. This protecting member 40 capable of extending and contracting may be entirely enabled to extend and to contract in the tubular axial direction, or one or more sections of the protecting member in the tubular axial direction may be enabled to extend and to contract. For example, the protecting member 40 may be entirely enabled to extend by providing flexibility to the entire protecting member 40 in the tubular axial direction. It is also possible to configure one or more sections of the protecting member 40 in the tubular axial direction to be flexible, and the remaining parts to be highly strong, so that the one or more sections enable the protecting member 40 to extend and to contract in the tubular axial direction, while the remaining highly strong parts improve the function of protecting the electric wire We. Furthermore, the protecting member 40 may be a member not only capable of extending and contracting in the tubular axial direction, but also is bendable in a direction inclined with respect to the tubular axial direction. Explained herein is an example in which the protecting member 40 is a corrugated tube that is circular and tubular. In the example explained herein, the protecting member 40 is provided for each of the electric wires We.

It is preferable for the protecting member 40 to have the end surface 41a of the one end 41 (FIGS. 2, 3, and 5) in abutment against the closing body 20, and to apply a pressing force F1 to the closing body 20 from the end surface 41a, as the resilience of the compressed protecting member 40 (FIG. 2). In such a case, in the closing-body holding structure and the electric wire with a connector WH according to the embodiment, merely required is coupling the protecting member 40 to the connector 1 in such a manner that the pressing force F1 is applied to the connector 1. In this manner, the end surface 41a of the one end 41 can be brought into abutment against the annular portion 24 of the closing body 20 without adjusting the relative position of the one end 41 with respect to the connector 1. Therefore, with the closing-body holding structure and the electric wire with a connector WH, the electric wire We between the closing body 20 and the protecting member 40 can be kept covered, so that the electric wire protection function between the closing body 20 and the protecting member 40 can be ensured. In particular, in the closing-body holding structure and the electric wire with a connector WH, because the one end 41 is housed inside of the housing chamber 22 of the closing body 20, this, together with the pressing force described above, can improve the electric wire protection function between the closing body 20 and the protecting member 40. In this manner, with the closing-body holding structure and the electric wire with a connector WH, because the protecting member 40 can be assembled to the connector 1 simply and easily without requiring the adjustment of the position of the one end 41, the workability in coupling the protecting member 40 to the connector 1 can be improved, while ensuring the electric wire protection function between the closing body 20 and the protecting member 40. For example, in the conventional example explained earlier, the position of the one end of the corrugated tube is adjusted by meshing the locking portions into respective grooves on the corrugated tube, but such a positional adjustment is not required in the closing-body holding structure and the electric wire with a connector WH.

A part other than the one end 41 (e.g., the other end), for example, is fixed to a predetermined position so that the end surface 41a of the compressed protecting member 40 is kept in abutment against the closing body 20. The predetermined position is a position that does not become displaced relatively to the counterpart connector. A process for fixing the protecting member 40 may be performed prior to a process of releasing the compressing force, which is described later, is performed, or subsequently to the process of releasing the compressing force is performed. In either way, in this electric wire with a connector WH, by fixing a part other than the one end 41 to a predetermined position, the end surface 41a of the compressed protecting member 40 can be kept in abutment against the closing body 20.

The electric wire with a connector WH according to the embodiment is assembled using a connector assembling method described below. The connector assembling method at least includes the following steps.

The connector assembling method according to the embodiment includes a step of inserting and passing the electric wire We into and through the wire outlet 11a provided to the opening portion 11. At this step of inserting the electric wire into the wire outlet 11a, either one end or the other end of the electric wire We is inserted into the wire outlet 11a, depending on various conditions such as the length of the electric wire We. In the example explained herein, one end of the electric wire We is inserted into the connector housing 10, by inserting and passing one end of the electric wire We into and through the wire outlet 11a in a direction that is opposite to the direction in which the electric wire We is pulled out.

In the connector assembling method according to the embodiment, subsequent to the completion of the step of inserting the electric wire into the wire outlet 11a, a step of attaching the conductive member (terminal metal fitting) to the one end of the electric wire We is provided. In the connector assembling method according to the embodiment, a step of housing the conductive member inside of the connector housing 10 is provided subsequent to the step of attaching the conductive member.

The connector assembling method according to the embodiment also includes a step of closing the wire outlet 11a by attaching the closing body 20 to the opening portion 11, with the electric wire We passed through the electric wire insertion hole 21, and of pulling the electric wire We out of the wire outlet 11a via the electric wire insertion hole 21, to the outside of the connector housing 10. This step of attaching the closing body is performed subsequent to the step of housing the conductive member inside of the connector housing 10.

Either one end or the other end of the electric wire We is inserted and passed through the electric wire insertion hole 21, depending on various conditions such as the length of the electric wire We. This step of inserting and passing the electric wire into and through the electric wire insertion hole 21 is performed at some timing before the step of inserting and passing the electric wire into and through the wire outlet 11a is performed, and before the step of attaching the closing body is performed. In the example explained herein, the one end of the electric wire We is inserted into and passed through the electric wire insertion hole 21 before the step of inserting and passing the electric wire into and through the wire outlet 11a is performed. Furthermore, in this connector assembling method, either one end or the other end of the electric wire W is also inserted into and passed through the electric wire insertion hole 21 provided to members such as the protecting member 40 and an annular water-proof member 51 (FIGS. 2, 3, and 5). This step of inserting and passing the electric wire into and through the members such as the protecting member 40 is performed at some timing before the step of inserting and passing the electric wire into and through the wire outlet 11a is performed, and before the step of attaching the closing body is performed. In the example explained herein, the one end of the electric wire We is inserted and passed through members such as the protecting member 40 before the step of inserting and passing the electric wire into and through the wire outlet 11a is performed (that is, at the timing equivalent to the timing at which the step of inserting and passing the electric wire into and through the electric wire insertion hole 21 is performed).

The connector assembling method according to the embodiment also includes a step of compressing the protecting member 40 through which the electric wire We is passed, with the electric wire We pulled out of the wire outlet 11a via the electric wire insertion hole 21. At this step of compressing the protecting member 40, at least the one end 41 of the protecting member 40 is compressed. Therefore, at this step of compressing the protecting member 40, the entire protecting member 40 may be compressed, or only the one end 41 of the protecting member 40 may be compressed.

This step of compressing the protecting member 40 may be performed before the step of inserting and passing the electric wire into and through the protecting member 40 is performed, or after the step of inserting and passing the electric wire into and through the protecting member 40 is performed. In the example explained herein, this step of compressing the protecting member 40 is performed after the step of inserting and passing the electric wire into and through the protecting member 40.

For example, this step of compressing the protecting member 40 is performed using a jig (not illustrated) attached to the one end 41 of the protecting member (corrugated tube) 40. The jig includes, for example, a first locking member, a second locking member, and a fixing mechanism that fixes the first locking member and the second locking member to each other. Each of the first locking member and the second locking member includes a first locking portion inserted into a first groove on the one end 41 of the protecting member 40, and a second locking portion inserted into a second groove on the one end 41. There are a plurality of other grooves between the first groove and the second groove. In this example, the first groove is positioned nearer to the end surface 41a than the second groove. The first locking member and the second locking member establish the interval between the first locking portion and the second locking portion to an interval corresponding to a desirable amount by which the section between the first groove and the second groove is compressed in the one end 41 of the protecting member 40. The fixing mechanism may be any mechanism for compressing the protecting member 40, and for temporarily holding the first locking member and the second locking member to the compressed protecting member 40, and a mechanism for fastening the locking members with screws, or a locking mechanism is used, for example.

At the step of compressing the protecting member 40, the first locking portion and the second locking portion of the first locking member are inserted into the first groove and the second groove, respectively, in the one end 41 of the protecting member 40, and the first locking portion and the second locking portion of the second locking member are inserted into the first groove and the second groove, respectively, in the one end 41 of the protecting member 40. The first locking member and the second locking member are then fixed to each other with the fixing mechanism, and are temporarily held on the protecting member 40. As a result, the one end 41 of the protecting member 40 becomes compressed in the axial line direction (FIGS. 4 and 5). A compressing force F2 from the first locking portions and the second locking portions of the first locking member and the second locking member is exerted upon the compressed protecting member 40 in the axial line direction, and, therefore, a resilience in the axial line direction is exerted upon to the first locking portions and the second locking portions of the first locking member and the second locking member, as a counter force.

The connector assembling method according to the embodiment includes a step of bringing the end surface 41a of the one end 41 of the protecting member 40 into abutment against the closing body 20, by causing the compressed protecting member 40 to extend by the resilience, and of causing the resilience of the compressed protecting member 40 to exert the pressing force F1 to the closing body 20 from the end surface 41a. In this step of releasing the compressing force, the end surface 41a comes into abutment against the annular portion 24 provided around the electric wire insertion hole 21, and the pressing force F1 is exerted upon the annular portion 24.

In the example explained herein, by removing the jig from the compressed protecting member 40, and releasing the compressing force F2 of the protecting member 40, the protecting member 40 is extended by the resilience. At this time, the resilience works in both directions of the axial line direction. Therefore, the fixing mechanism included in the jig is configured in such a manner that, when the fixture of the first locking member and the second locking member is released, for example, the first locking portions can be removed from the first groove, with the second locking portions remaining inserted in the second groove. In this manner, in the protecting member 40, it is possible to allow the one end 41 to extend in such a manner that the end surface 41a is moved closer to the closing body 20 by the resilience. Therefore, the one end 41 of the protecting member 40 is inserted into the housing chamber 22 by the resilience. In this protecting member 40, the end surface 41a is brought into abutment against the closing body 20, and the pressing force F1 resultant of the resilience is exerted upon the closing body 20 from the end surface 41a, while the protecting member 40 remains compressed (FIG. 2).

As explained above, with the closing-body holding structure and the electric wire with a connector WH according to the embodiment, it is possible to maintain the configuration of the closing body 20 coupled to the opening portion 11 of the connector housing 10 as intended, while ensuring the electric wire protection function achieved by the protecting member 40. Furthermore, in this closing-body holding structure and the electric wire with a connector WH, by using the protecting member 40 enabled to extend and to contract in the tubular axial direction, the pressing force F1 can be exerted upon the closing body 20 from the end surface 41a. As a result, the closing body 20 is pressed against the connector housing 10, and therefore, the function of the connector housing 10 holding the closing body 20 with respect to the opening portion 11 can be improved further. Still furthermore, in the closing-body holding structure and the electric wire with a connector WH, by using the protecting member 40 enabled to extend and to contract in the tubular axial direction, the easiness of assembling of the protecting member 40 can be improved.

Modification

Figure 6:
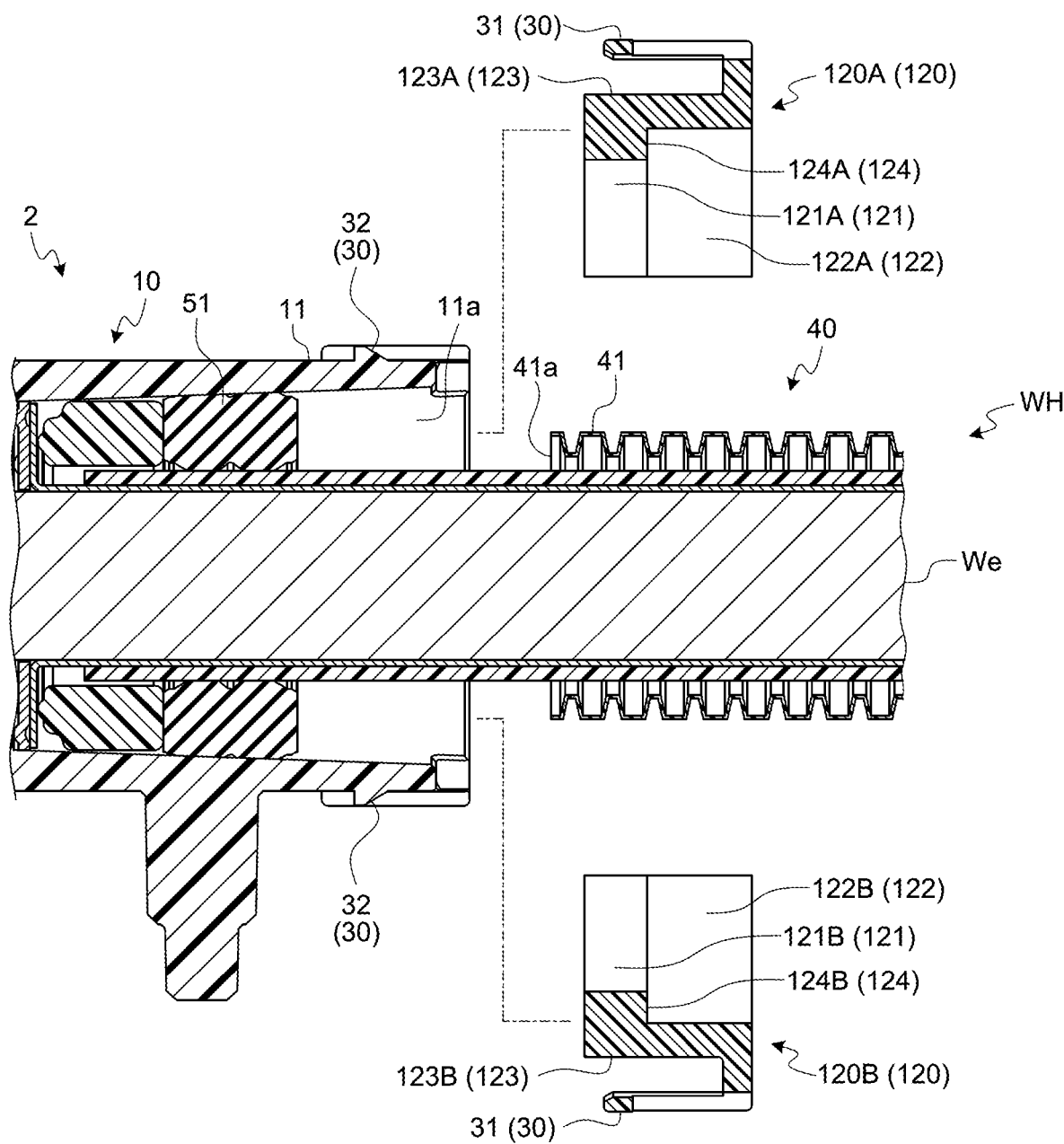
FIG. 6 is an exploded sectional view of a part of an electric wire with a connector according to a modification.
Figure 7:
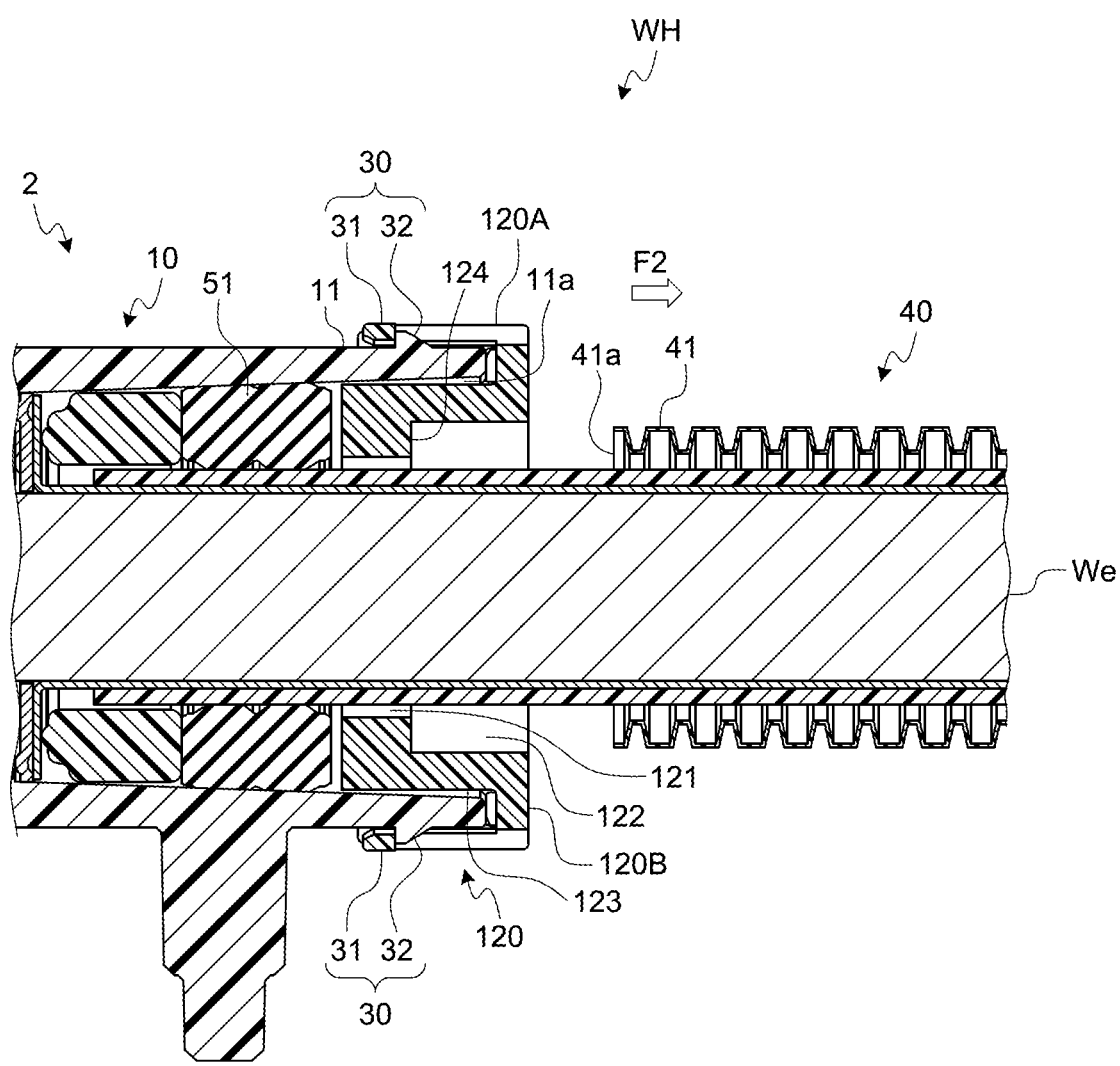
FIG. 7 is a sectional view illustrating the electric wire with a connector according to the modification.

The reference sign 2 in FIGS. 6 and 7 denotes a connector according to a modification. The reference sign WH in FIGS. 6 and 7 denotes an electric wire with a connector, in which the connector 2 is attached to the electric wire We in a manner electrically connected to each other. The closing-body holding structure and the electric wire with a connector WH according to the modification correspond to the closing-body holding structure and the electric wire with a connector WH according to the embodiment described above, except that the closing body 20 is replaced with a closing body 120 described below. In the explanation of the modification, specific explanations will be omitted for the elements assigned with the same reference signs as those in the embodiment.

The closing body 120 according to the modification is attached to the opening portion 11 of the connector housing 10, and closes the wire outlet 11a in the opening portion 11, and has a through-hole (electric wire insertion hole) 121 for inserting and passing the electric wire We pulled out of the wire outlet 11a (FIGS. 6 and 7), in the same manner as the closing body 20 according to the embodiment. The closing body 120 according to the modification also includes a housing chamber 122 for housing the one end 41 of the protecting member 40, an inserted portion 123 including the housing chamber 122 and inserted into the opening portion 11 (FIGS. 6 and 7), in the same manner as the closing body 20 according to the embodiment. The closing body 120 according to the modification also has an annular portion 124 for locking the end surface 41a of the one end 41 of the protecting member 40 that is housed in the housing chamber 122, in the tubular axial direction, around the electric wire insertion hole 121 (FIGS. 6 and 7), in the same manner as the closing body 20 according to the embodiment. This closing body 120 is made of an insulating material such as a synthetic resin.

The closing body 120 in the example explained herein has a shape equivalent to that of the closing body 20 according to the embodiment. Therefore, in the closing body 120 in the example explained herein, the electric wire insertion hole 121 that is circular is provided for each of the electric wires We. The inserted portion 123 in the example explained herein has a track-like shape, and is provided with the cylindrical housing chamber 122 for each of the electric wires We and the protecting members 40. The annular portion 124 in the example explained herein has a circular annular shape, and forms a part of the wall surface of the housing chamber 122.

The closing body 120 according to the modification, however, has a structure that is divided into two, that is, into a first closing member 120A and a second closing member 120B (FIGS. 6 and 7). The first closing member 120A and the second closing member 120B in the example explained herein have shapes resultant of dividing the closing body 20 according to the embodiment into two in such a manner that they both have equivalent shapes.

In the closing body 120, the inserted portion 123 is formed by a first inserted portion 123A of the first closing member 120A and a second inserted portion 123B of the second closing member 120B (FIG. 6). In this example, each of the first inserted portion 123A and the second inserted portion 123B has a half track-like shape that is a half of the track-like shape, and the first inserted portion 123A and the second inserted portion 123B together provide the inserted portion 123 having a track-like shape when the first closing member 120A and the second closing member 120B are assembled to each other. The first inserted portion 123A is provided with a first groove 121A, a first cavity 122A, and a first semi-annular portion 124A described below. The second inserted portion 123B is provided with a second groove 121B, a second cavity 122B, and a second semi-annular portion 124B described below.

In this closing body 120, the electric wire insertion hole 121 is formed by the first groove 121A of the first closing member 120A and the second groove 121B of the second closing member 120B (FIG. 6). In the example explained herein, the first groove 121A and the second groove 121B are both provided as a semi-circular groove, and the first closing member 120A and the second closing member 120B together provide the circular electric wire insertion hole 121 when the first closing member 120A and the second closing member 120B are assembled to each other.

The closing body 120 has the housing chamber 122 that is formed by the first cavity 122A in the first closing member 120A and the second cavity 122B in the second closing member 120B (FIG. 6). In this example, each of the first cavity 122A and the second cavity 122B is provided as a semi-cylindrical cavity, and the first cavity 122A and the second cavity 122B together provide the cylindrical housing chamber 122 when the first closing member 120A and the second closing member 120B are assembled with each other.

The closing body 120 also has the annular portion 124 that is formed by the first semi-annular portion 124A of the first closing member 120A and the second semi-annular portion 124B of the second closing member 120B (FIG. 6). In this example, each of the first semi-annular portion 124A and the second semi-annular portion 124B is provided as a semi-circular annular brim portion, and the first semi-annular portion 124A and the second semi-annular portion 124B together form the circular annular portion 124 when the first closing member 120A and the second closing member 120B are assembled to each other.

In a connector assembling method according to the modification, the step of inserting and passing the electric wire into and through the electric wire insertion hole 21 is not performed, as in the connector assembling method according to the embodiment, and, after the step of inserting and passing the electric wire into and through the wire outlet 11a is performed, for example, the first closing member 120A and the second closing member 120B are assembled to the electric wire We and the opening portion 11 of the connector housing 10, before the step of compressing the protecting member 40 is performed. Through such assembling, the first closing member 120A and the second closing member 120B together form the closing body 120. In this modification, too, by using the protecting member 40 capable of extending and contracting in the tubular axial direction, the protecting member 40 is assembled, through the step of compressing and the step of releasing the compressing force, in the same manner as in the embodiment. Therefore, the end surface 41a of the one end 41 of the protecting member 40 is brought into abutment against the closing body 120, so that the resilience of the compressed protecting member 40 serves as the pressing force F1 exerted upon the annular portion 124 of the closing body 120 from the end surface 41a (FIG. 7), in the same manner as in the embodiment.

The closing-body holding structure and the electric wire with a connector WH according to the modification can achieve the same advantageous effects as those explained in the embodiment, even when the closing body 120 described above is used.

Figure 8:
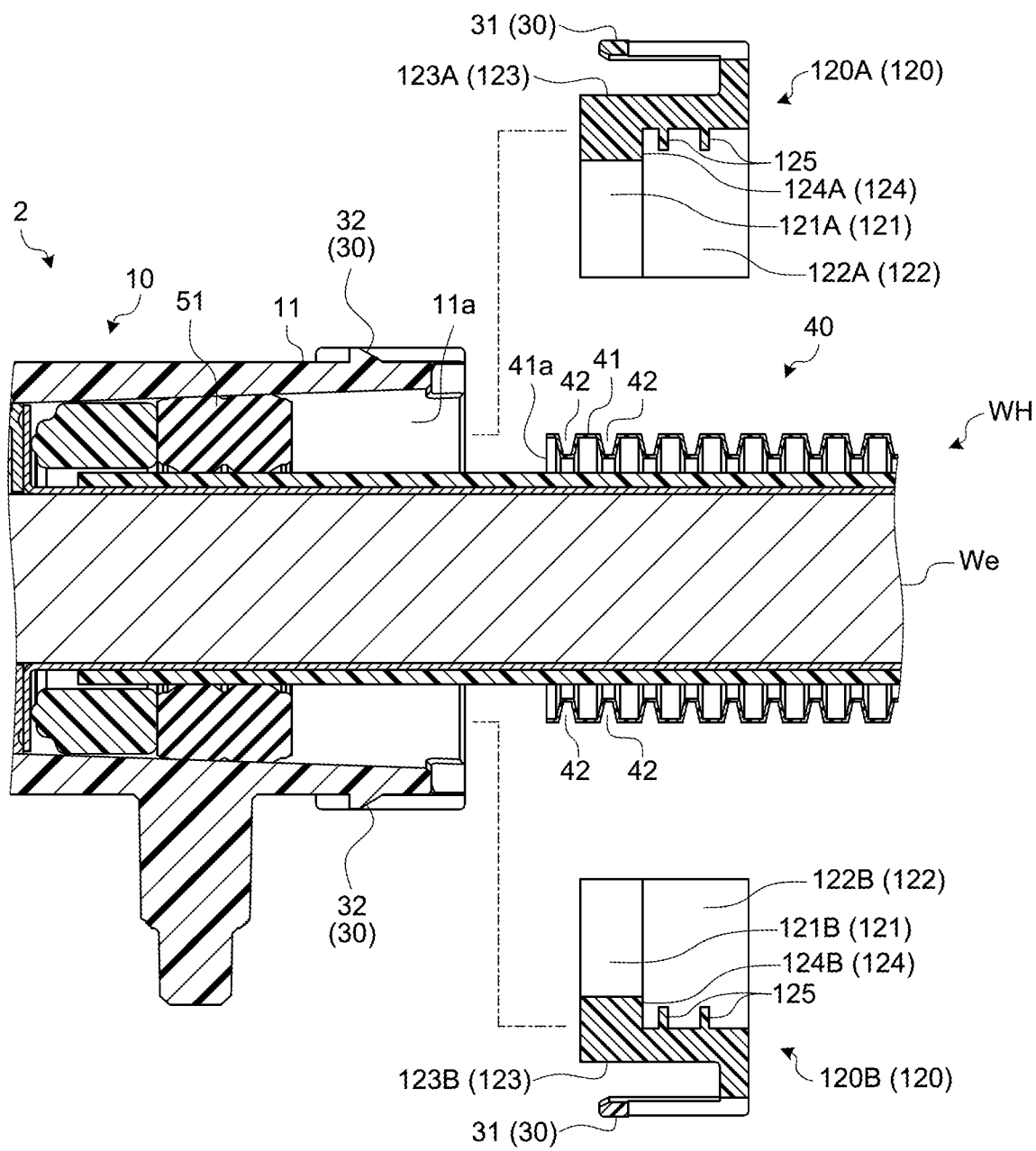
FIG. 8 is an exploded sectional view of a part of the electric wire with a connector according to the modification, illustrating a modified closing body.
Figure 9:
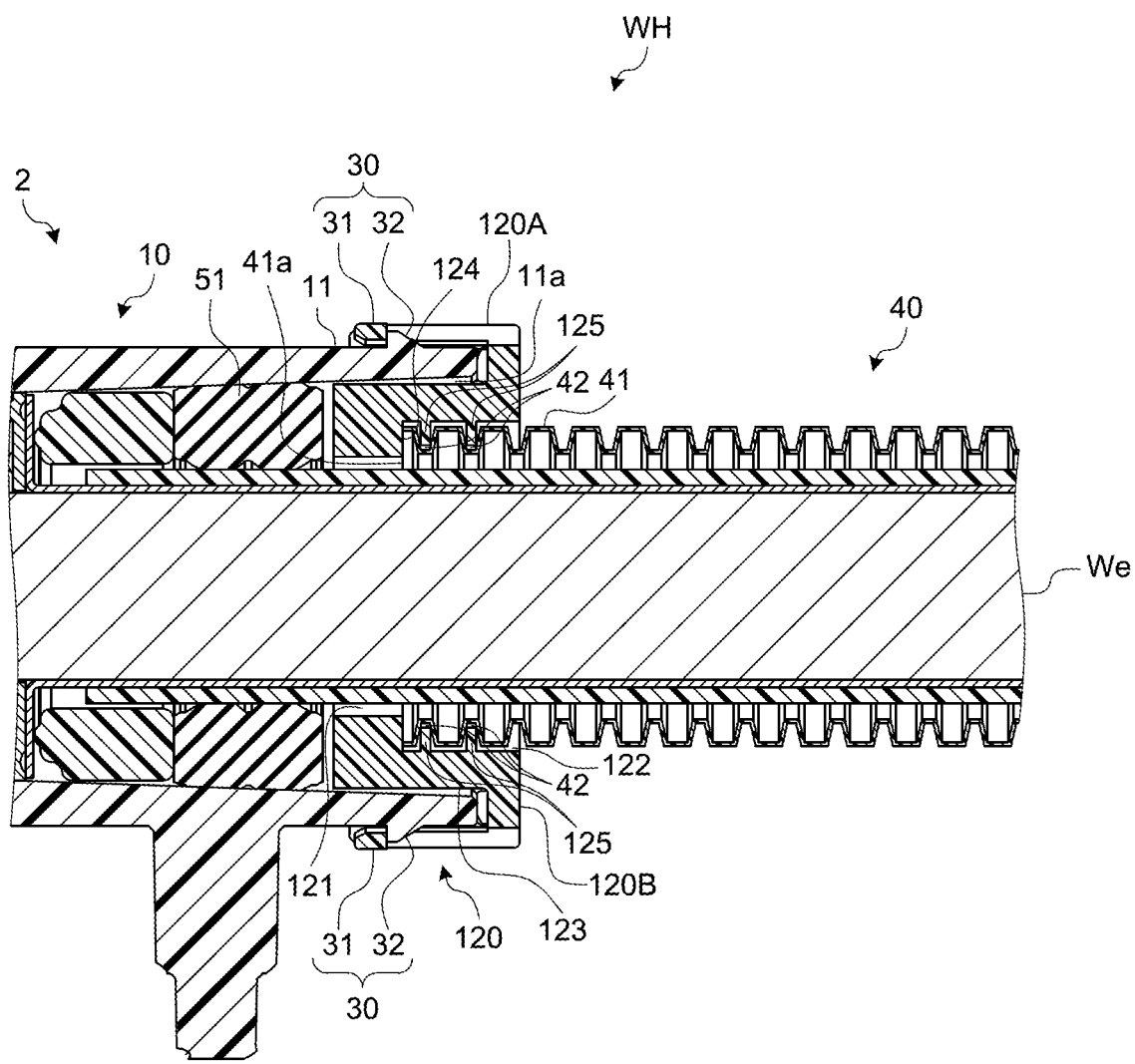
FIG. 9 is a sectional view illustrating the electric wire with a connector according to the modification, illustrating the modified closing body.

The closing body 120 according to the modification may be provided with a locking portion 125 for locking the movement of the protecting member 40 in the tubular axial direction (FIGS. 8 and 9). The locking portion 125 is a part for locking the relative movement of the protecting member 40 with respect to the closing body 120 in the tubular axial direction. The locking portion 125 in the example explained herein is provided as a projection that is inserted into a groove 42 of the protecting member (corrugated tube) 40. In this example, the locking portion 125 is provided in plurality, in a manner spaced from each other in the tubular axial direction, on the inner circumferential surface of each of the first cavity 122A in the first closing member 120A and the second cavity 122B in the second closing member 120B. On the inner circumferential surface of the first cavity 122A, the locking portions 125 are provided as coaxial semi-circular annular brim portions protruding from the inner circumferential surface, inwardly in the radial direction, in a manner corresponding to respective grooves 42 into which the respective locking portions 125 are to be inserted. On the inner circumferential surface of the second cavity 122B, the locking portions 125 that are the same as those provided to the first cavity 122A are provided correspondingly to the respective grooves 42 into which the locking portions 125 are to be inserted. The closing-body holding structure and the electric wire with a connector WH according to the modification can achieve the same advantageous effects as those explained in the embodiment even when using the closing body 120 provided with such locking portions 125.

In the closing-body holding structure and the electric wire with a connector according to the present embodiment, the closing body includes an inserted portion, and the inserted portion is inserted into the opening portion. Therefore, even when an external force is applied to the protecting member or the wire covered with the protecting member, and results in a force in the radial direction being exerted upon the inner circumferential surface of the housing chamber from the outer circumferential side of the one end of the protecting member, for example, the inserted portion remains locked by the inner circumferential surface of the opening portion. In other words, in the closing-body holding structure and the electric wire with a connector, it is possible to suppress a relative displacement of the closing body with respect to the opening portion, even if a force is exerted upon the closing body from the one end of the protecting member. Therefore, with the closing-body holding structure and the electric wire with a connector according to present invention, the configuration of the closing body coupled to the opening portion of the connector housing can be maintained as intended.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A closing-body holding structure comprising:
   an opening portion that is provided to a connector housing, and that allows an electric wire to be extended from an inside of the connector housing to an outside of the connector housing;
   a closing body that has an electric wire insertion hole configured to receive the electric wire extended through a wire outlet of the opening portion, and that closes the wire outlet by being attached to the opening portion; and
   a protecting member that is tubular, and into and through which the electric wire is extended through the wire outlet via the electric wire insertion hole is inserted and passed, wherein
   the closing body includes a housing chamber that houses one end of the protecting member, and an inserted portion that includes the housing chamber and that is inserted into the opening portion,
   the closing body includes an annular portion around the electric wire insertion hole, the annular portion locking, in the tubular axial direction of the protecting member, an end surface of the one end of the protecting member housed inside of the housing chamber,
   at least a part of the protecting member is capable of extending and contracting in the tubular axial direction, and
   the protecting member makes the end surface of the one end abut against the annular portion, and applies a pressing force to the annular portion from the end surface by a resilience of the protection member sustained in a compressed state.

2. The closing-body holding structure according to claim 1, wherein
   a holding mechanism configured to hold the closing body with respect to the opening portion is provided between the opening portion and the closing body.

3. The closing-body holding structure according to claim 2, wherein
   the closing body has a structure divided into two members that are a first closing member and a second closing member, the inserted portion is formed by a first inserted portion of the first closing member and a second inserted portion of the second closing member, the electric wire insertion hole is formed by a first groove of the first closing member and a second groove of the second closing member, and the housing chamber is formed by a first cavity in the first closing member and a second cavity in the second closing member.

4. The closing-body holding structure according to claim 1, wherein
   the closing body has a structure divided into two members that are a first closing member and a second closing member, the inserted portion is formed by a first inserted portion of the first closing member and a second inserted portion of the second closing member, the electric wire insertion hole is formed by a first groove of the first closing member and a second groove of the second closing member, and the housing chamber is formed by a first cavity in the first closing member and a second cavity in the second closing member.

5. The closing-body holding structure according to claim 1, wherein
   the closing body is configured to attach directly to an outer surface of the opening portion facing opposite the inside of the connector housing, and
   the outer surface of the opening portion faces opposite the inside of the connector housing in a direction perpendicular to a direction in which the electric wire insertion hole is configured to receive the electric wire.

6. The closing-body holding structure according to claim 1, wherein the
   the closing body is configured to attach directly to an outer surface of the opening portion facing opposite the inside of the connector housing, and
   the closing body is configured to attached directly to the outer surface by a cantilevered arm extended from the inside of the connector housing to an outside of the connector housing.

7. An electric wire with a connector comprising:
   a connector;
   an electric wire; and
   a protecting member that protects the electric wire, wherein
   the connector includes:
      a connector housing that has an opening portion that allows the electric wire to be extended from an inside of the connector housing to an outside of the connector housing; and
      a closing body that has an electric wire insertion hole configured to receive the electric wire extended through a wire outlet of the opening portion, and that closes the wire outlet by being attached to the opening portion,
   the protecting member is a tubular member into and through which the electric wire is extended through the wire outlet via the electric wire insertion hole is inserted and passed, and
   the closing body includes a housing chamber that houses one end of the protecting member, and an inserted portion that includes the housing chamber and that is inserted into the opening portion, the closing body includes an annular portion around the electric wire insertion hole, the annular portion locking, in the tubular axial direction of the protecting member, an end surface of the one end of the protecting member housed inside of the housing chamber, at least a part of the protecting member is capable of extending and contracting in the tubular axial direction, and the protecting member makes the end surface of the one end abut against the annular portion, and applies a pressing force to the annular portion from the end surface by a resilience of the protection member sustained in a compressed state.

* * * * *